(12) United States Patent
Queveau et al.

(10) Patent No.: US 7,032,947 B2
(45) Date of Patent: Apr. 25, 2006

(54) VEHICLE BACK SHELF

(75) Inventors: Gerard Queveau, Le Pin (FR); Jean-Marc Guillez, Cirieres (FR); Paul Queveau, Montravers (FR)

(73) Assignee: Societe Furoneenne des Brevets Automobiles, Paris (FR)

( * ) Notice: Subject to any disclaimer, the term of this patent is extended or adjusted under 35 U.S.C. 154(b) by 0 days.

(21) Appl. No.: 10/500,066

(22) PCT Filed: May 2, 2003

(86) PCT No.: PCT/FR03/01381

§ 371 (c)(1),
(2), (4) Date: Dec. 3, 2004

(87) PCT Pub. No.: WO03/095255

PCT Pub. Date: Nov. 20, 2003

(65) Prior Publication Data

US 2005/0077750 A1    Apr. 14, 2005

(30) Foreign Application Priority Data

May 13, 2002    (FR) ................... 02 05869

(51) Int. Cl.
*B60J 7/20* (2006.01)
(52) U.S. Cl. .............. 296/24.44; 296/107.08; 296/136.05; 296/107.01
(58) Field of Classification Search ............ 296/24.44, 296/37.16, 107.08, 107.01, 107.17, 136.01, 296/136.04–136.06
See application file for complete search history.

(56) References Cited

U.S. PATENT DOCUMENTS

| | | | | |
|---|---|---|---|---|
| 4,799,729 A | * | 1/1989 | Muscat | 296/136.06 |
| 5,967,593 A | * | 10/1999 | Schuler et al. | 296/136.06 |
| 6,010,178 A | * | 1/2000 | Hahn et al. | 296/107.08 |
| 6,318,792 B1 | * | 11/2001 | Neubrand et al. | 296/107.08 |
| 6,364,396 B1 | * | 4/2002 | Hayashi et al. | 296/136.06 |
| 6,454,343 B1 | * | 9/2002 | Wagner et al. | 296/107.08 |
| 6,604,774 B1 | * | 8/2003 | Koch et al. | 296/107.08 |
| 6,644,715 B1 | * | 11/2003 | Bohnke | 296/107.08 |
| 6,672,645 B1 | * | 1/2004 | Quindt | 296/107.08 |
| 6,682,149 B1 | * | 1/2004 | Guillez et al. | 296/108 |
| 6,722,723 B1 | * | 4/2004 | Obendiek | 296/107.08 |
| 6,736,443 B1 | * | 5/2004 | Holst et al. | 296/107.08 |
| 2004/0124660 A1 | * | 7/2004 | Heller et al. | 296/107.01 |

OTHER PUBLICATIONS

International Search Report for PCT/FR03/01381; ISA/EP; Mailed: Sep. 4, 2003.

* cited by examiner

*Primary Examiner*—H. Gutman
(74) *Attorney, Agent, or Firm*—Harness, Dickey & Pierce, P.L.C.

(57) ABSTRACT

A vehicle back shelf (1) comprises a central plate (6) and two side plates (7) each of which is movable relative to the central plate (6). The back shelf includes mechanism (8) adapted to control and guide the sliding of each of the side plates (7) relative to the central plate (6) in the transverse direction (19) of the vehicle in both directions between a deployed position and a retracted position in which each side plate (7) is substantially retracted under the central plate (6).

9 Claims, 2 Drawing Sheets

12 # VEHICLE BACK SHELF

BACKGROUND OF THE INVENTION

The present invention relates to a back shelf for a vehicle, in particular a vehicle provided with a roof that is foldable into the rear trunk of the vehicle.

A vehicle back shelf is known that is movable between an in-use position where it is placed substantially horizontally between the rear partition of the vehicle cabin and a front edge of the rear trunk lid, and a retracted position in which it is placed so as to release space between the rear partition and the front edge of the lid and enable a folding roof to pass therethrough, the shelf comprising a central plate and two side plates that are movable relative to the central plate.

BRIEF SUMMARY OF THE INVENTION

The object of the invention is to provide a device suitable for moving each of the side plates in simple and reliable manner so that the movement of the back shelf is facilitated, and so that in the retracted position the space occupied by the back shelf is reduced.

According to the invention, a back shelf of the above-specified type includes means suitable for controlling and guiding the sliding of each of the side plates relative to the central plate substantially in the transverse direction of the vehicle in both directions between a deployed position and a retracted position in which each side plate is substantially retracted under the central plate.

Thus, the space occupied by the back shelf in the transverse direction of the vehicle can be reduced, thereby making it possible to use locations of small size for receiving the back shelf in the retracted position.

Other features of the present invention appear from the following description.

BRIEF DESCRIPTION OF THE DRAWINGS

In the accompanying drawings, given as non-limiting examples.

DETAILED DESCRIPTION OF THE INVENTION

Figure 1:
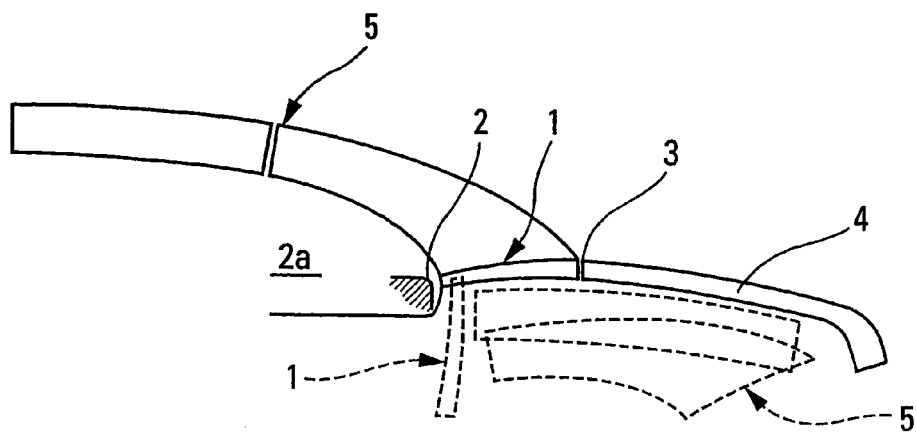
FIG. 1 is a diagrammatic longitudinal section view of the rear portion of a vehicle.
Figure 2:
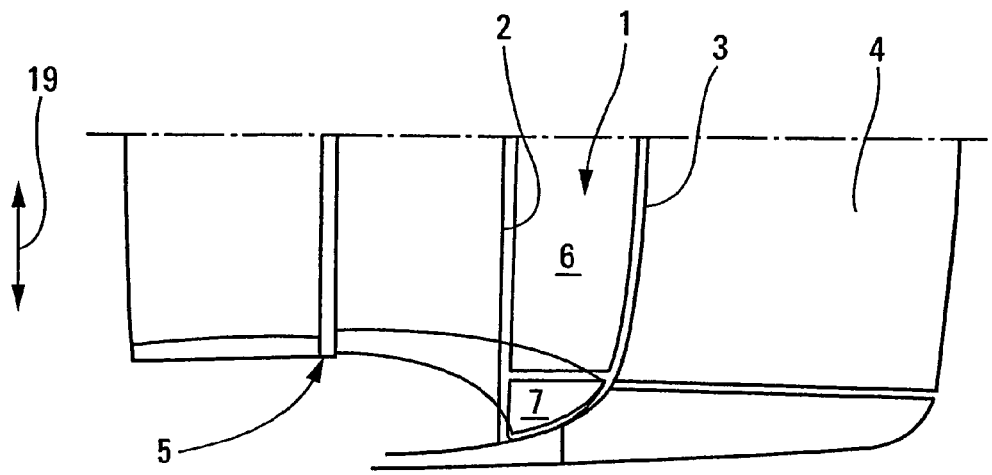
FIG. 2 is a half-view from above of the same portion of the vehicle.

A back shelf 1 for a vehicle is movable between an in-use position and a retracted position. As can be seen in FIGS. 1 and 2, in the in-use position, the back shelf 1 is disposed substantially horizontally between a rear partition 2 of the vehicle cabin 2a and a front edge 3 of the lid 4 of the rear trunk. In the retracted position, the back shelf 1 is disposed in such a manner as to release the space between the rear partition 2 and the front edge 3 of the lid 4 so as to allow the folding roof 5 of the vehicle to pass therethrough. By way of example, the partition 2 is behind the seat situated furthest back in the vehicle.

In FIG. 1, the folding roof 5 is shown in continuous lines in its deployed position where it covers the cabin, and in dashed lines in its folded position inside the trunk.

In the retracted position, the back shelf 1 may be disposed substantially vertically, for example, by pivoting about at least one pivot axis oriented transversely relative to the vehicle, as shown diagrammatically in FIG. 1, it being possible for the back shelf 1 to occupy other positions when in its retracted position.

The back shelf 1 comprises a central plate 6 and two side plates 7, with each of the side plates 7 being disposed transversely relative to the vehicle in line with the central plate 6. Each of the side plates 7 is movable relative to the central plate 6.

Only the left side plate 7 is shown in FIGS. 2 to 5, the right side plate (not shown) being symmetrical to the left side plate 7.

In the present invention, the back shelf 1 includes means 8 adapted to control and guide sliding of each of the side plates 7 relative to the central plate 6, substantially in the transverse direction 19 of the vehicle, between a deployed position and a retracted position in which each side plate 7 is substantially retracted under the central plate 6. The means 8 enable each side plate 7 to slide both from its deployed position to its retracted position and from its retracted position to its deployed position.

Figure 4:
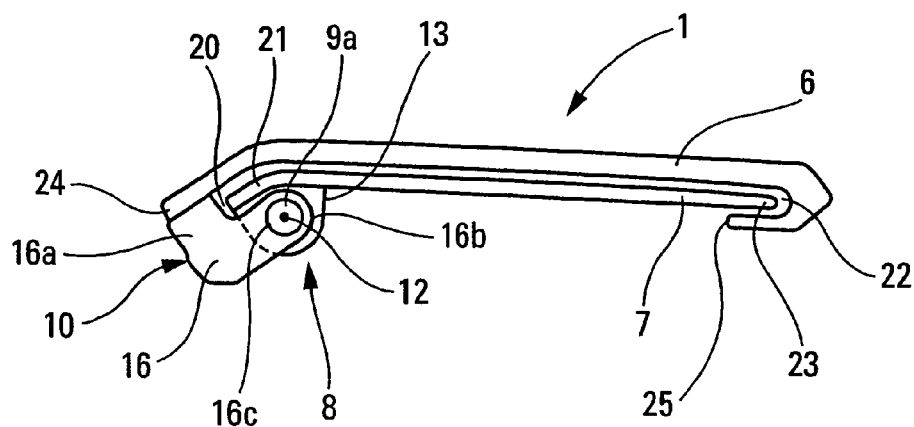
FIG. 4 is a section view through the back shelf on line IV—IV of FIG. 3.
Figure 5:
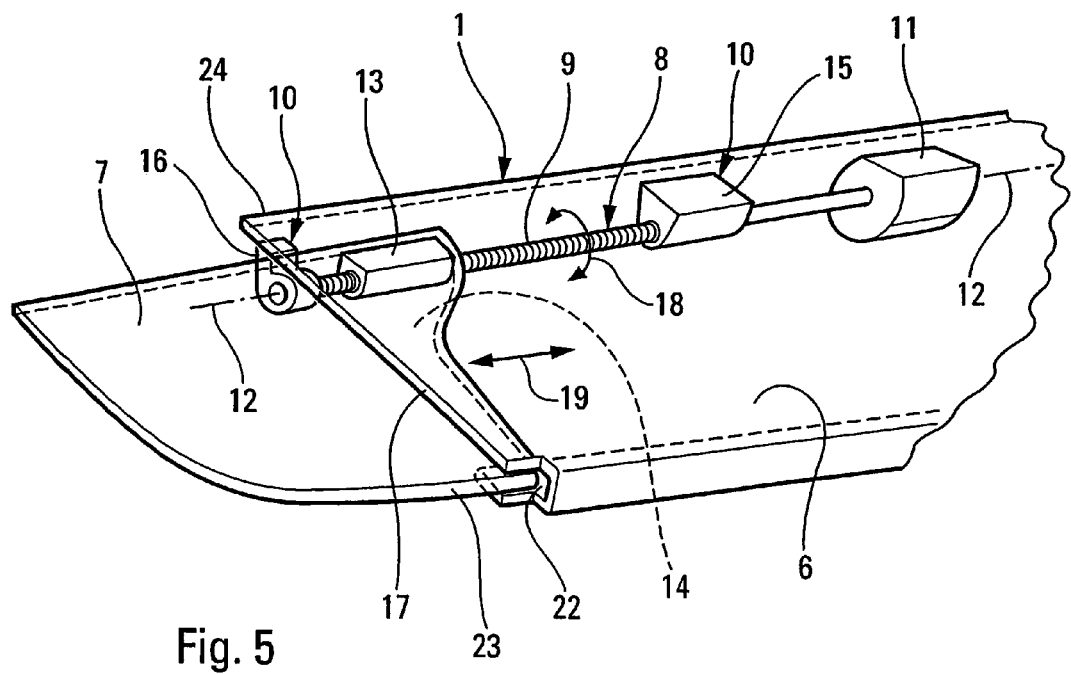
FIG. 5 is a view similar to FIG. 3, with the means for causing the side plate to slide relative to the central plate being shown as though visible through the plates.

In the example shown in FIGS. 4 and 5, the means 8 adapted to enabling the side plates 7 to slide comprise at least one threaded rod 9 which preferably extends in the transverse direction 19 of the vehicle and which is disposed under the central plate 6.

The means 8 adapted to enable the side plates 7 to slide also comprise means 10 for securing the threaded rod 9 to the central plate 6, and means 11 adapted to cause the threaded rod 9 to rotate about its axis 12, which means may be constituted by a motor 11, for example.

The means 8 adapted to enable the side plates 7 to slide also comprise, for each side plate 7, at least one nut 13 which is fixed to the corresponding side plate 7 and which is adapted to drive the corresponding side plate 7 in translation during rotation of the threaded rod 9.

Figure 3:
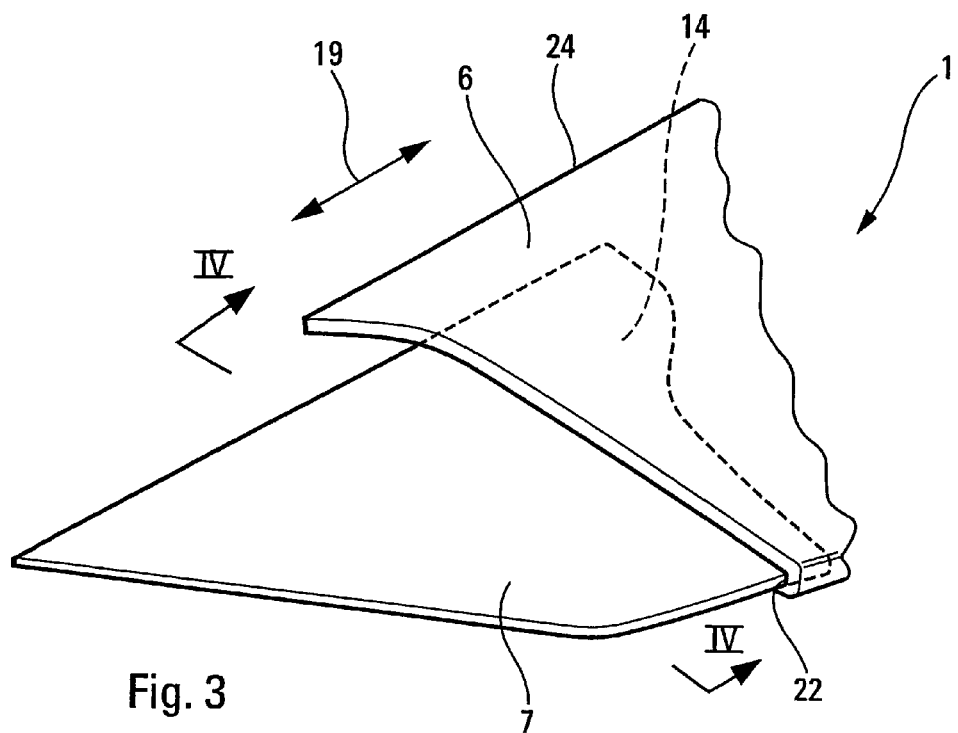
FIG. 3 is a perspective view showing a side portion of a back shelf of the present invention, the side plate being shown in the deployed position.

As can be seen particularly clearly in FIGS. 3 and 5, each side plate 7 includes a drive zone 14 which is disposed under the central plate 6 when the side plate 7 is in the deployed position. Each nut 13 is secured to the corresponding side plate 7 via said drive zone 14.

Thus, once the motor 11 has been put into operation, the threaded rod 9 is caused to rotate about its axis 12 in one direction or the other (as represented in FIG. 5 by arrow 18). Since the threaded rod 9 is secured axially to the central plate 6, its only degree of freedom is in rotation, and because of the co-operation between the threads of the threaded rod 9 and those of the nuts 13, the two side plates 7 are driven in translation in one direction or the other (as represented in FIG. 5 by arrow 19).

Thus, the means 8 adapted to enable the side plates 7 to slide enable the transverse size of the back shelf 1 to be reduced when the side plates 7 are in the retracted position under the central plate 6.

The threaded rod 9 may present threads solely on two portions corresponding to the amplitude of movement in translation of the corresponding nut 13. Under such circumstances, the two threads are made to be oppositely handed so that rotation of the screw 9 causes the nuts 13 to slide in opposite directions. Furthermore, those portions of the threaded rod 9 that are in the contact with the means 10 suitable for securing the threaded rod 9 to the central plate 6, are not themselves threaded.

In the example shown in FIGS. 4 and 5, the means 10 adapted to securing the threaded rod 9 to the central plate 6 preferably comprise two supports 15 situated close to the motor 11, and two smooth bearings 16 each located close to one of the side edges 17 of the central plate 6.

As can be seen particularly well in FIG. 4, each smooth bearing 16 is cantilevered out from the central plate 6 in such a manner as to form a slot 20 which is suitable for passing the corresponding transverse edge 21 of the corresponding side plate 7.

In order to limit the extent to which each smooth bearing 16 is cantilevered out, the threaded rod 9 is preferably located close to one of the transverse edges 21 of the side plates 7, in this case the front edge.

In the example shown in FIGS. 4 and 5, each smooth bearing 16 is fixed along a transverse edge 24 of the central plate 6 and is substantially L-shaped, comprising a foot 16a which is fixed to said edge 24 and a body 16b which extends under the central plate 6, substantially parallel therewith and towards the inside thereof going away from the foot 16a so as to form the slot 20, the body 16b including a hole 16c that receives the end 9a of the screw 9 and that constitutes the smooth bearing proper.

In addition, in order to guide each of the side plates 7 while being moved in translation, the central plate 6 has a groove 22 extending in the transverse direction of the vehicle and formed by an inwardly-directed rim 25 extending under the central plate 6 (see FIG. 4). The groove 22 is adapted to receive slidably in translation the transverse edge 23 of each of the side plates 7 that is opposite from its edge that passes through the slot 20, in this case it receives the rear edge.

In the example shown in FIGS. 1 to 5, the elements constituting the back shelf 1 in accordance with the present invention are disposed symmetrically about the longitudinal axis of the vehicle, and about the motor 11.

Naturally, the present invention is not limited to the embodiments described with reference to the figures, and numerous modifications can be applied thereto.

It would thus be possible to provide the central plate with two grooves, each extending in the transverse direction 19 of the vehicle and adapted to receive slidably in translation a transverse edge of each of the side plates 7, thus making it possible to omit the smooth bearings 16.

It would also be possible to provide two screws 9 substantially on the same axis, one for each side plate 7, the two screws turning in opposite directions being driven either by two respective motors, or by a single motor driving a gearbox with two outlets.

The invention claimed is:

1. A vehicle back shelf (1) that is movable between an in-use position in which said back shelf is disposed substantially horizontally between a rear partition (2) of the vehicle cabin and a front edge (3) of a rear truck lid (4), and a retracted position in which said back shelf is disposed in such a manner as to leave space between the rear partition (2) and the front edge (3) of the lid (4) and allow a folding roof (5) to pas therethrough, the back shelf (1) comprising a central plate (6) and two side plates (7) each of which is movable relative to the central plate (6), and means (8) suitable for controlling and guiding the sliding by a movement of translation of each of the side plates (7) relative to the central plate (6) substantially in the transverse direction (19) of the vehicle in both directions between a deployed position and a retracted position in which each side plate (7) is substantially retracted under the central plate (6).

2. A back shelf (1) according to claim 1, wherein said means (8) adapted to enable the side plates (7) to slide comprise at least one threaded rod (9) having an axis of rotation (12) and extending in the transverse direction (19) of the vehicle under the central plate (6), means (11) adapted to rotate the threaded rod (9) about said axis (12), means (10) adapted to secure the threaded rod (9) to the central plate (6), and for each side plate (7), a nut (13) secured to the corresponding side plate (7), and adapted to cooperate with the thread rod in such a manner as to drive the corresponding side plate (7) in translation during rotation of the threaded rod (9).

3. A back shelf (1) according to claim 2, wherein each side plate (7) includes a drive zone (14) which is disposed underneath the central plate (6) when the side plate (7) is in the deployed position.

4. A back shelf (1) according to claim 3, wherein each nut (13) is fixed to the drive zone (14) of the corresponding side plate (7).

5. A back shelf (1) according to claim 2, wherein a smooth bearing (16) forming a support (10) for a corresponding end (9a) of the threaded rod (9) is fixed in the vicinity of each of the side edges (17) of the central plate (6).

6. A back shelf (1) according to claim 5, wherein each smooth bearing (16) is arranged and shaped in such a manner as to form a slot (2) adapted to pass the corresponding transverse edge (21) of the side plate (7).

7. A back shelf (1) according to claim 6, wherein each smooth bearing (16) is fixed along a transverse edge (24) of the central plates (6) and is substantially L-shaped, comprising a foot (16a) fixed to said edge (24) and a body (16b) extending under the central plate (6) substantially parallel thereto towards the inside thereof from the foot (16a) so as to form the slot (2) the body (16b) including a hole (16c) receiving the said corresponding end (9a) of the threaded rod (9) and constituting the smooth bearing proper.

8. A back shelf (1) according to claim 1, wherein the central plate (6) includes at least one groove (22) extending in the sliding direction (19) and adapted to receive in translation a corresponding transverse edge (23) of each of the side plates (7).

9. A vehicle back shelf (1) that is movable between an in-use position in which said back shelf is disposed substantially horizontally between a rear partition (2) of the vehicle cabin and a front edge (3) of a rear trunk lid (4), and a retracted position in which said back shelf is disposed in such a manner as to leave space between the rear partition (2) and the front edge (3) of the lid (4) and allow a folding roof (5) to pass therethrough, the back shelf (1) comprising:
a central plate (6), two side plates (7) each of which is movable relative to the central plate (6), and means (8) suitable for controlling and guiding the sliding of each of the side plates (7) relative to the central plate (6) substantially in the transverse direction (19) of the vehicle in both directions between a deployed position and a retracted position in which each side plate (7) is substantially retracted under the central plate (6), wherein said central plate (6) includes at least one groove (22) extending in the sliding direction (19) and adapted to receive in translation a corresponding transverse edge (23) of each of the side plates (7).

* * * * *

UNITED STATES PATENT AND TRADEMARK OFFICE
CERTIFICATE OF CORRECTION

PATENT NO. : 7,032,947 B2
APPLICATION NO. : 10/500066
DATED : April 25, 2006
INVENTOR(S) : Queveau et al.

It is certified that error appears in the above-identified patent and that said Letters Patent is hereby corrected as shown below:

Title page,
Item [73] Assignee: delete "Furoneenne" and replace with --Europeenne--.

Signed and Sealed this

Fourth Day of July, 2006

JON W. DUDAS
*Director of the United States Patent and Trademark Office*